Feb. 16, 1943. H. L. DERSHEM 2,311,433
JIG
Filed July 21, 1941
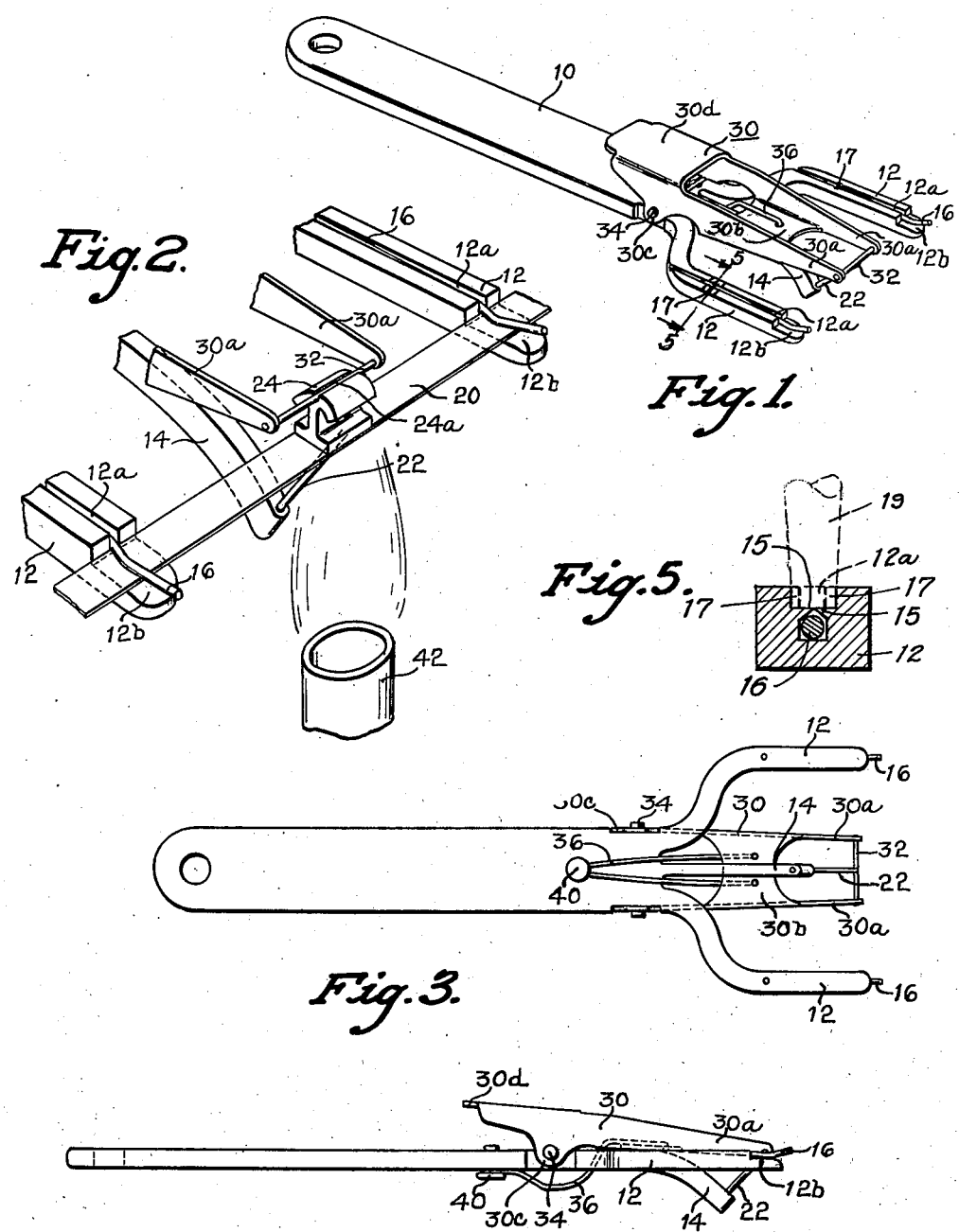
INVENTOR
Herbert L. Dershem
BY Henry G. Dvirig
ATTORNEY Patented Feb. 16, 1943

2,311,433

UNITED STATES PATENT OFFICE 2,311,433

JIG

Herbert L. Dershem, near Yellow Springs, Ohio

Application July 21, 1941, Serial No. 403,390

10 Claims. (Cl. 113—99)

This invention relates to a jig for use by orthodontists and particularly to a jig for holding the edgewise bracket upon its band during the soldering operation.

Orthodontists use brackets soldered upon bands for holding braces in position. Some orthodontists use gold brackets and gold bands. The soldering material is usually sold as a part of the bracket, which soldering material is applied to the contacting surface of the bracket. This soldering material may consist of a low karat gold, having a lower melting point than the gold in the main body of the bracket and in the gold band. Instead of gold, other suitable metals or alloys may be used, such as white gold, stainless steel and the like. The brackets and bands may be purchased separately before being soldered. Before mounting the bracket and band in position, the orthodontist solders the bracket upon the band.

An object of this invention is to provide a jig for use in the manufacture of brackets upon bands used by orthodontists.

Another object of this invention is to provide a jig for the manufacture of bracket and band assemblies used by orthodontists, which jig is accurate in its performance, easily manipulated, dependable and efficient.

Another object of this invention is to provide a jig for aligning the bracket upon its band during the soldering operation, which jig is so constructed as to prevent rapid absorption of the heat applied to the parts in the jig.

Another object of this invention is to provide a jig for use in the manufacture of brackets and bands used by orthodontists, which jig supports the band on the side opposite the bracket.

Another object of this invention is to provide a jig for use in the manufacture of brackets and bands used by orthodontists, wherein the band and bracket are properly aligned and resiliently urged toward each other during the soldering operation.

Other objects and advantages reside in the construction of parts, the combination thereof and the mode of operation, as will become more apparent from the following description.

In the drawing,

Figure 1 is a perspective view of the jig for use in soldering a bracket upon a band for use by orthodontists.

Figure 2 is a fragmentary view drawn to a larger scale than the other figures to show the holding parts of the jig engaging a bracket aligned with the band.

Figure 3 is a bottom view of the jig.

Figure 4 is a side view of the jig.

Figure 5 is an enlarged cross sectional view taken substantially on the line 5—5 of Figure 1, showing the punch in dotted lines.

For the sake of clearness, the drawing has been drawn to a scale considerably larger than the jig.

The jig disclosed herein is primarily constructed to properly align the parts and hold the pieces to be soldered in proper relation with respect to each other. This jig includes a trifurcated supporting member having two arms or prongs supporting the ends of the band and the third or median arm or prong supporting a slender support engaging the band opposite the bracket. This jig also includes a resiliently mounted bracket engaging means gently urging the bracket into contact with the band during the soldering operation and for a brief period thereafter, so as to properly position the bracket relative to the band.

Referring to the drawing, the reference character 10 indicates the main body portion and the handle of the jig. The end of the main body portion 10 is trifurcated, so as to provide a pair of lateral prongs or arms 12 and a supporting prong 14. Each of the arms 12 is provided with a longitudinal groove 12a, terminating in a notch 12b in the ends of the arms. A resilient wire-like member 16 is laid in the groove and held in position by spurs 15 of metal formed by a punch 19, shown schematically by dotted lines in Figure 5, forming dents 17. Member 16 is first laid in the bottom of the groove and then a punch wider than the groove is driven into the groove to form the spurs holding member 16 in position. The outer end of member 16 is curved or deflected towards the bottom of the notch to resiliently hold a band 20 in position when inserted between notch and member 16.

The center of the band 20 is supported upon a needle-like support 22 seated in a suitable aperture in the end of the center prong 14 that has been deflected downwardly, as best seen in Figure 4. Due to the conductivity of heat by metallic parts, the portions of the jig in proximity to the flame during the soldering operation should be as small as consistent with the function thereof, so as to preserve all the heat available.

An edgewise bracket 24 that is to be soldered in position is placed directly above the needle-like member 22. The underside of the bracket 24 is coated with gold solder, which may be a gold alloy. This is resiliently held in position by bracket retaining means that includes a bifurcated member 30 made from sheet metal. The prongs or arms 30a support a transversely disposed wire 32 resting in the groove 24a of the bracket 24. The wire 32 extends parallel to the longitudinal axis of the band 20.

Bifurcated member 30 is provided with a bridge portion 30b that reenforces the arms 30a. Each of the side arms 30a is provided with a downwardly directed ear 30c, through which extends a pintle 34 secured to the main body portion 10. This pintle is preferably seated in a transverse groove in member 10 and held in position by spurs formed by punches. Bifurcated member 30 is pivotally mounted for swinging or oscillatory movement about the pintle 34. The rear end of member 30 is provided with a finger depressing handle portion 30d.

Member 30 is biased in a clockwise direction, as viewed in Figures 1 and 4, by a wire steel spring 36, having a looped portion seated under the head of the rivet 40 extending through the main body portion 10. Each branch of the spring is deflected so as to form a shape simulating an S with the free ends projecting through suitable apertures in the bridge portion 30b.

*Mode of operation*

The orthodontist first depresses the handle 30d with the thumb of his hand, so as to separate the wire 32 from the support 22. He then places the band 20 between the resiliently mounted retaining member 16 and the ledge formed by the notch 12b. The band is preferably pushed against the shoulders of the notches. If the band is straight and properly positioned endwise, the center of the band overlies the support 22. The bracket 24, as best seen in Figure 2, is then placed on the center of the band directly above the support, with the groove of the notch aligned with the wire 32. The thumb is then released, so as to cause the spring 36 to actuate the bifurcated member 30 supporting the wire 32 towards the band, the wire 32 advancing into the groove 24a of the bracket 24, so as to resiliently hold the edgewise bracket 24 in contact with the band in proper position. The parts are now ready for the application of the heat. The jig is preferably held in the flame of a Bunsen burner 42, having the flame directed on the underside of the band 20 directly below the bracket 24. It is held in this position until the solder adhering to the underside of the bracket 24 melts. When the solder has melted, the jig, together with the parts held thereby, is removed from the flame of the Bunsen burner and permitted to cool sufficiently to solidify the solder. The gold band, together with the bracket, is then removed by again depressing the handle portion 30d of member 30, so as to separate the wire 32 from the groove in the bracket, when the bracket and the gold band may be removed as a unit. The bracket is now ready for use. The jig is ready for the soldering of another bracket to its gold band.

The gold bands 20 are not always straight. In spite of the fact that orthodontists may order straight bands, some are found to have a curvature, so that the band, seated against the shoulders formed by the notches 12b, does not extend straight across the jig. This may be corrected by extending the arms 30a, so that the distance from the center of the wire 32 to the outer extremity of the arms 30a is equal to one-half the band width. The edge of the band 20 directly below the arms 30a may then be aligned with the ends of the arms 30a, thereby partially correcting the error caused by the curvature of the band. By this arrangement, the bracket 24 will be positioned nearly on the center of the band, in spite of the curvature thereof.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A jig for use by orthodontists in soldering an edgewise notched bracket upon a metallic band, the notch extending in the direction parallel to the longitudinal axis of the band, the combination including means for supporting the ends of the band, a support engaging one side of the band near its center, and means for clamping a bracket against the band opposite the center support, said means including a wire-like member extending parallel to the band and positioned in the notch so as to hold the bracket in position during the application of heat during the soldering operation.

2. A jig for use by orthodontists in soldering an edgewise notched bracket member upon a metallic band member, the notch extending in the direction parallel to the longitudinal axis of the band member, one of said members having solder applied thereto, said jig including a trifurcated member providing a pair of laterally disposed prongs and a center prong, means associated with the laterally disposed prongs for holding the ends of said band member, supporting means connected to the center prong for contacting the center of one side of the band member, and resilient means including a wire-like member seated in the notch of the bracket member positioned upon the band member on the side opposite said support for holding the bracket member in position upon the band member during the soldering operation.

3. A jig for use by orthodontists in soldering an edgewise notched bracket member upon a metallic band member, the notch extending in the direction parallel to the longitudinal axis of the band member, one of said members having solder applied thereto, said jig including a main body member having one end trifurcated and the opposite end formed into a handle portion, means associated with two of the prongs of said trifurcated member for holding said band member, a needle-like member supported by the third prong and projecting into engagement with the center of the underside of the band member, and means including a member seated in the notch of the bracket member positioned upon the band member on the side opposite said needle-like member for holding the bracket member in position upon the band member during the soldering operation.

4. A jig for use by orthodontists in soldering an edgewise notched bracket member upon a metallic band member, the notch extending in the direction parallel to the longitudinal axis of the band member, one of said members having solder applied thereto, said jig including a main body portion, means cooperating with the main body portion for holding said band member, a needle-like support attached to the main body portion for supporting one side of the center of the band member, and a resiliently supported member located in the notch for holding the bracket member on the band member opposite said support during the soldering operation.

5. A jig for use by orthodontists in soldering an edgewise notched bracket member upon a metallic band member, the notch extending in the direction parallel to the longitudinal axis of the band member, one of said members having solder applied thereto, said jig including a main body portion having a bifurcated end providing a pair of prongs, means associated with the prongs for supporting said band member, a needle-like support, means for holding said needle-like support in contact with one side of the band member near its center, and resilient means cooperating with the notch of the bracket member positioned upon the band member opposite the support for holding the bracket member in position during the soldering operation.

6. A jig for use by orthodontists in soldering an edgewise notched bracket member upon a metallic band member, the notch extending in the direction parallel to the longitudinal axis of the band member, one of said members having solder applied thereto, said jig including a handle portion constituting the main body portion, a pair of laterally disposed arm-like members projecting from the main body portion, means associated with said arm-like members for supporting the ends of the band member, a needle-like member underlying the center of the band member, means for supporting the needle-like member upon the main body portion, and resilient means engaging said notch for clamping the bracket member upon the band member opposite the supporting member for holding the parts in position during the soldering operation.

7. A jig for use by orthodontists in soldering an edgewise notched bracket member upon a metallic band member, the notch extending in the direction parallel to the longitudinal axis of the band member, one of said members having solder applied thereto, said jig including a handle constituting the main body portion, a pair of laterally disposed arm-like members projecting from the main body portion, said arm-like members being notched at their ends, said band member being positioned in the notches of said arm-like members during the soldering operation, and means including a pair of clamping members one of which engages the band member near the center thereof on the side opposite the bracket, the other member being seated in the notch for clamping the bracket member near the center of the band member during the soldering operation.

8. A jig for use by orthodontists in soldering an edgewise bracket member upon a metallic band member, one of said members having solder applied thereto, said jig including a handle constituting the main body portion, a pair of laterally disposed arm-like members projecting from the main body portion, said arm-like members being notched at their ends, resilient means associated with the notches for holding the ends of the band member during the soldering operation, and means for clamping the bracket member near the center of the band member during the soldering operation.

9. A jig for use by orthodontists in soldering an edgewise notched bracket member upon a metallic band member, the notch extending in the direction parallel to the longitudinal axis of the band member, one of said members having solder applied thereto, said jig including a handle constituting the main body portion, a pair of laterally disposed arm-like members projecting from the main body portion, means associated with the ends of the arm-like members for supporting the band member, a prong projecting from the main body portion, a needle-like member supported by the prong engaging the under side of the band member near its center and means seated in the notch of the bracket and cooperating with said needle-like member to clamp the bracket member in engagement with the band member during the soldering operation.

10. A jig for use by orthodontists in soldering an edgewise notched bracket member upon a metallic band member, the notch extending in the direction parallel to the longitudinal axis of the band member, one of said members having solder applied thereto, said jig including a main body portion having means for supporting the band member in spaced relation from the center of the band member, a needle-like member engaging the under side of the band member at its center, and means including a pivotally mounted bifurcated member supporting a wire-like member seated in the notch for holding the bracket member against the band member.

HERBERT L. DERSHEM.